United States Patent
Costanzo

(10) Patent No.: US 7,357,246 B2
(45) Date of Patent: Apr. 15, 2008

(54) BELT CONVEYOR HAVING SELF-CLEARING FLIGHTS

(75) Inventor: Mark Costanzo, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/533,628

(22) Filed: Sep. 20, 2006

(65) Prior Publication Data

US 2007/0068776 A1    Mar. 29, 2007

Related U.S. Application Data

(60) Provisional application No. 60/596,452, filed on Sep. 23, 2005.

(51) Int. Cl.
*B65G 17/16* (2006.01)

(52) U.S. Cl. ..................... 198/799; 198/853

(58) Field of Classification Search ............ 198/699.1, 198/384, 387, 799, 850, 853
See application file for complete search history.

(56) References Cited

U.S. PATENT DOCUMENTS

| | | | |
|---|---|---|---|
| 4,410,079 A * | 10/1983 | Niederer et al. ............ | 198/779 |
| 4,676,361 A | 6/1987 | Heisler | |
| 5,038,921 A | 8/1991 | Hoppmann et al. | |
| 5,096,050 A | 3/1992 | Hodlewsky | |
| 5,190,137 A | 3/1993 | Tas | |
| 5,224,583 A | 7/1993 | Palmaer et al. | |
| 5,377,819 A | 1/1995 | Horton et al. | |
| 5,469,956 A * | 11/1995 | Greve et al. ................ | 198/853 |
| 6,148,990 A | 11/2000 | Lapeyre et al. | |
| 6,318,544 B1 | 11/2001 | O'Connor et al. | |
| 6,390,285 B2 | 5/2002 | de Geus et al. | |
| 6,398,015 B1 | 6/2002 | Sedlacek et al. | |
| 6,467,610 B1 * | 10/2002 | MacLachlan ............... | 198/853 |
| 6,681,922 B2 | 1/2004 | Corley et al. | |
| 6,811,021 B1 * | 11/2004 | Corley ........................ | 198/853 |
| 2006/0096841 A1 * | 5/2006 | Wieting et al. ............. | 198/779 |
| 2006/0151304 A1 * | 7/2006 | Ozaki et al. ................ | 198/853 |
| 2006/0207862 A1 | 9/2006 | Costanzo et al. | |

OTHER PUBLICATIONS

Intralox, Inc. brochure "New Product News Hold Down Roller Assemblies for Elevating Conveyors," Copyright 1992, Intralox, Inc., Harahan, Louisiana, U.S.A.

* cited by examiner

*Primary Examiner*—James R. Bidwell
(74) *Attorney, Agent, or Firm*—James T. Cronvich

(57) ABSTRACT

A conveyor having rollers supported above the conveying surface of a belt to prevent conveyed articles from being stranded atop flights or other positioning elements. The rollers may be passive or driven actively either directly by rolling contact with a carryway or indirectly through a transmission linked to accelerating rollers in direct contact with a supporting carryway. Accelerating rollers extend through the belt past the conveying surface to support conveyed articles and past an opposite surface of the belt into rolling contact with the carryway. The accelerating rollers may be axle-mounted, in-line or oblique, or freely rotatable roller balls. As the belt advances, the accelerating rollers propel conveyed articles forward over any supported roller the article is leaning on into a registration position against a flight, frictional area, or other registration element.

22 Claims, 6 Drawing Sheets

BELT CONVEYOR HAVING SELF-CLEARING FLIGHTS

BACKGROUND

The invention relates to power-driven conveyors generally and, more particularly, to belt conveyors having rollers supported above the conveying surface on or adjacent to flights to prevent articles lowered onto the conveying surface from resting atop the flights.

Many conveyor applications require that conveyed articles be separated into individual groups atop a conveyor belt. Flights extending upward from the belt's conveying surface and across its width at spaced intervals are used to divide the belt into bins. A conveyed article or a group of conveyed articles is separated from another article or group of articles in a neighboring bin by an interposed flight or other bin divider. Flights are also used to help push articles up inclined paths and to form registration surfaces against which articles can be registered. In some applications, articles are fed to a conveyor belt from a position above the belt. If the belt has flights, it is possible for an article to be deposited onto the belt in a position leaning against the top of a flight. If the position of a conveyed article is important, it may be unsatisfactory to strand articles leaning against flights and costly to require manual or automated intervention to re-position leaning articles.

Thus, there is a need for a belt conveyor that can separate articles in bins without stranding articles deposited from above against flights or other bin dividers.

SUMMARY

This need and other needs are satisfied in a belt conveyor embodying features of the invention. The conveyor comprises a conveyor belt that extends longitudinally in a direction of belt travel along a conveying path, laterally from a first side edge to a second side edge, and in thickness from a conveying surface to an opposite surface. A carryway supports the conveyor belt along a portion of the conveying path. Laterally disposed supports upstanding from the conveying surface at longitudinally spaced positions separate the conveying surface into individual article-conveying bins. Rollers are mounted at distal ends of the supports.

BRIEF DESCRIPTION OF THE DRAWINGS

These features of the invention, as well as its advantages and other aspects, are better understood by reference to the following description, appended claims, and accompanying drawings, in which:

DETAILED DESCRIPTION

Figure 1:
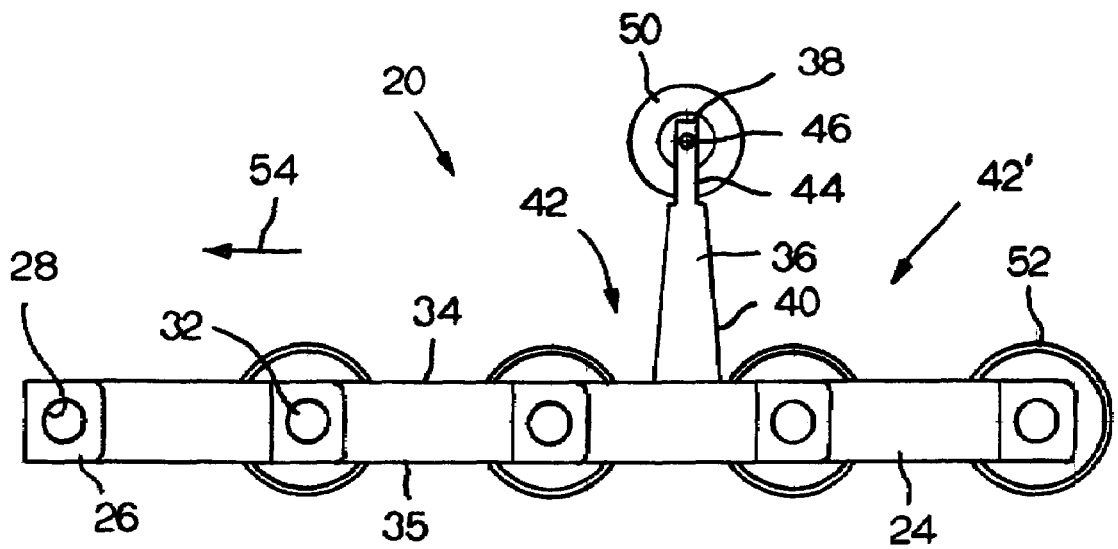
FIG. 1 is a side elevation view representing a portion of a conveyor belt embodying features of the invention, including a passive supported roller.
Figure 2:
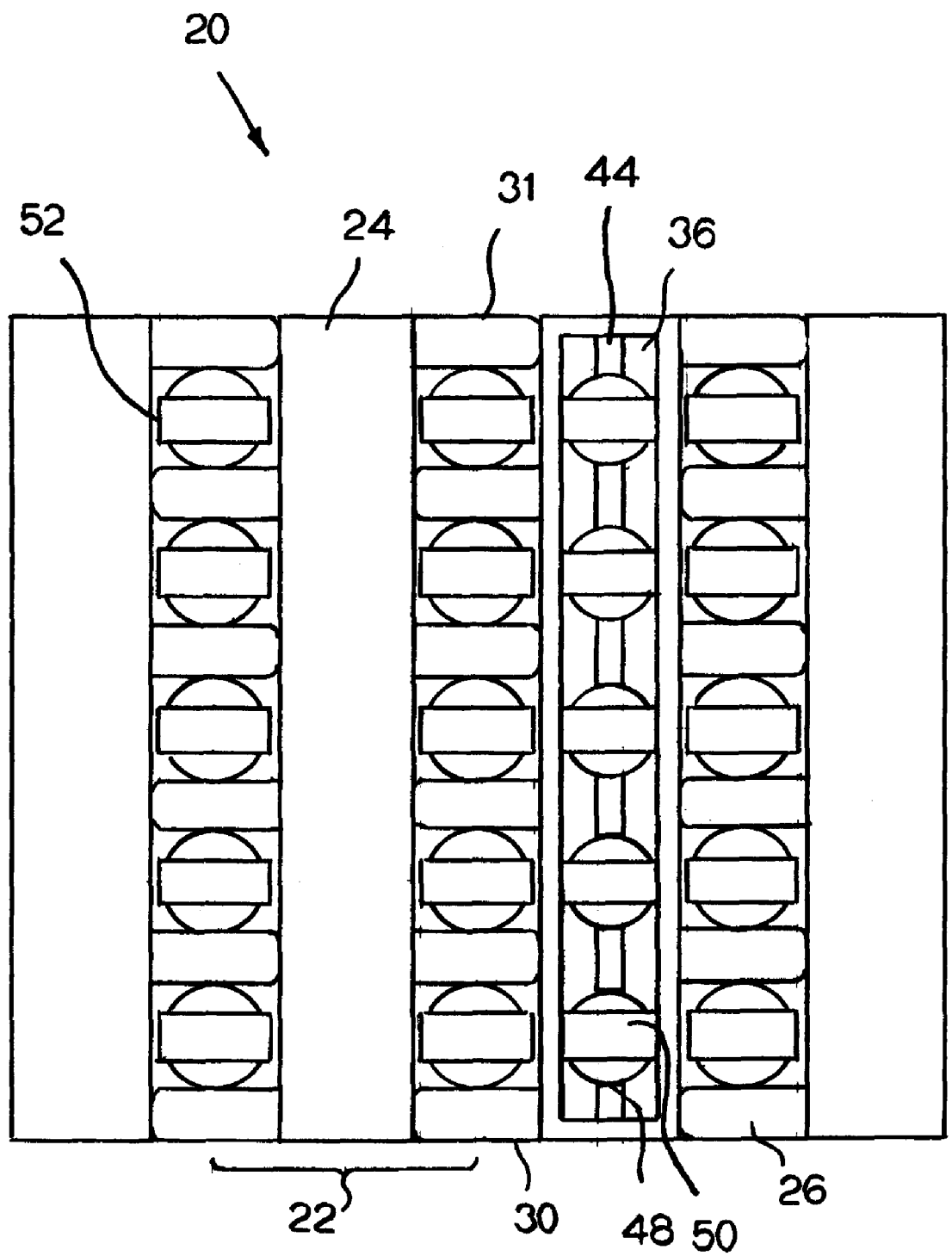
FIG. 2 is a top plan view representing one version of a conveyor belt as in FIG. 1, including multiple rollers across the width of the belt.

A portion of a conveyor belt embodying features of the invention is shown in FIGS. 1 and 2. The conveyor belt 20 is constructed of rows 22 of one or more modules 24. Each row terminates longitudinally in hinge eyes 26, which are interleaved with the hinge eyes of an adjacent row. Holes 28 formed in the hinge eyes are aligned in the interleaved hinge eyes to form a lateral passageway from a first side edge 30 to a second side edge 31 of the belt. A hinge rod 32 received in the passageway connects adjacent rows together into an endless belt. Although a modular conveyor belt is represented by the drawing, the features of the invention could be realized in a rubber or fabric flat belt as well. Exemplary plastic modular conveyor belts are manufactured and sold by Intralox, L.L.C., of Harahan, La., U.S.A.

The conveyor belt depicted in FIG. 1 extends in thickness from a top conveying surface 34 to an opposite bottom surface 35, which typically includes structure for receiving a driving force from a sprocket or other conventional drive element (not shown). A support 36 extends upward from the conveying surface to a distal end 38. The support may be integrally formed with or bonded to the belt or may be attached by fasteners, adhesives, bands, locking tabs, or the like. The support shown in FIG. 1 includes a flight portion 40 separating the conveying surface into individual bins 42, 42' on opposite sides of the flight. The support also includes support arms 44 that extend above the flight. Apertures 46 through the ends of the arms admit a lateral axle 48 through bores in rollers 50 mounted at the distal ends of the supports. The conveyor belt is also shown with accelerating rollers 52 mounted on the hinge rods in cavities between hinge eyes. The accelerating rollers extend past the conveying and opposite surfaces of the belt. The accelerating rollers, when riding along bearing surfaces on a carryway, rotate to propel conveyed articles in line with the direction of belt travel 54 at up to twice the linear speed of the belt and into registration with the flight. Accelerating rollers so oriented are referred to as in-line rollers. Because the rollers extend above the flights, any article dropped onto the belt from above atop a roller is pushed easily over the supported roller by the action of the accelerating rollers on the end of the article sitting atop them.

Figure 3:
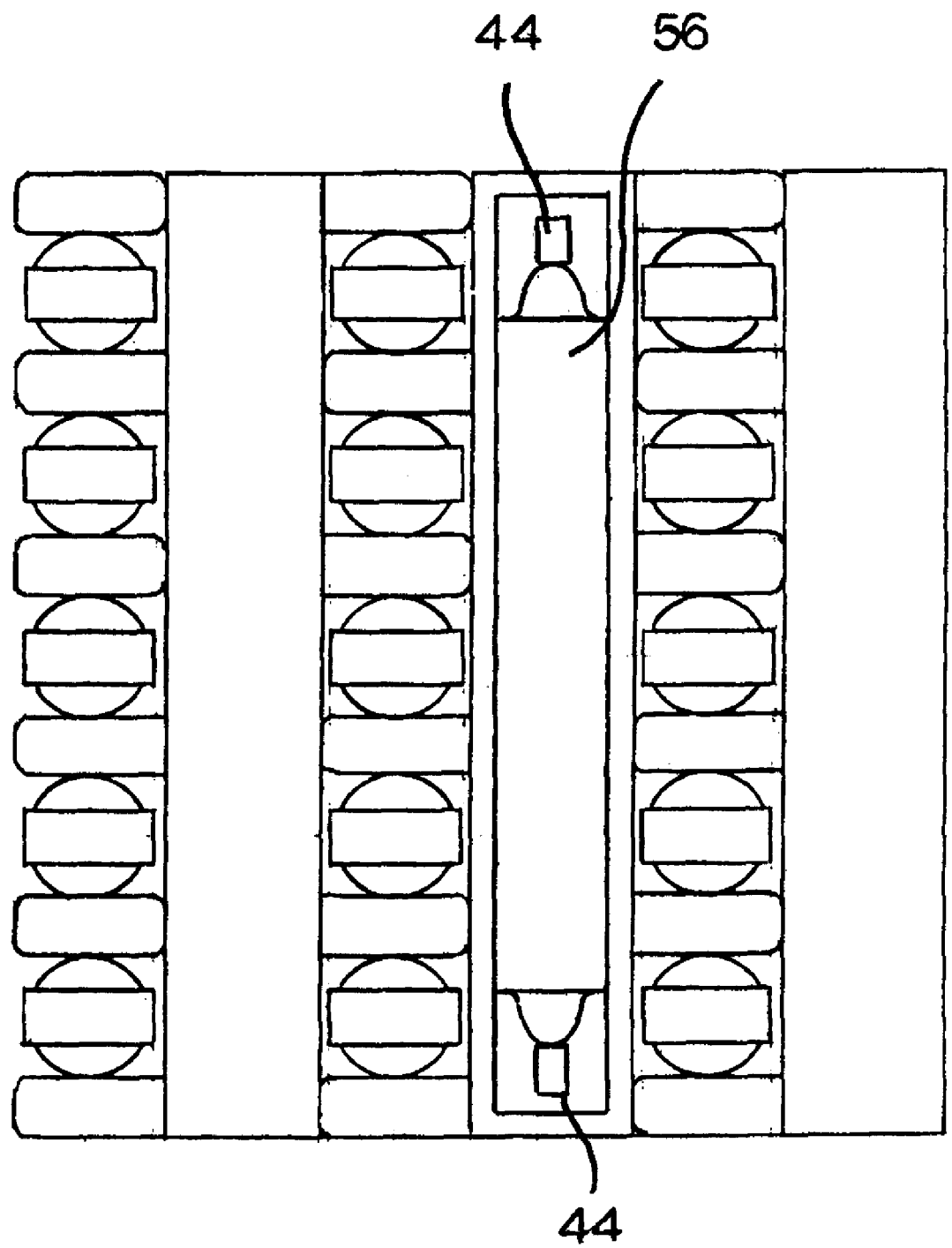
FIG. 3 is a top plan view representing another version of a conveyor belt as in FIG. 1, including a single, long roller across the width of the belt.

In another version of the belt, depicted in FIG. 3, a long roller 56 takes the place of the small rollers 50 of FIG. 2. The long roller is supported on an axle retained at opposite ends by arms 44. In both FIG. 2 and FIG. 3, the rollers 50, 56 are passive in that they are not driven into rotation. They rotate only by contact with conveyed articles propelled along the belt.

Figure 4:
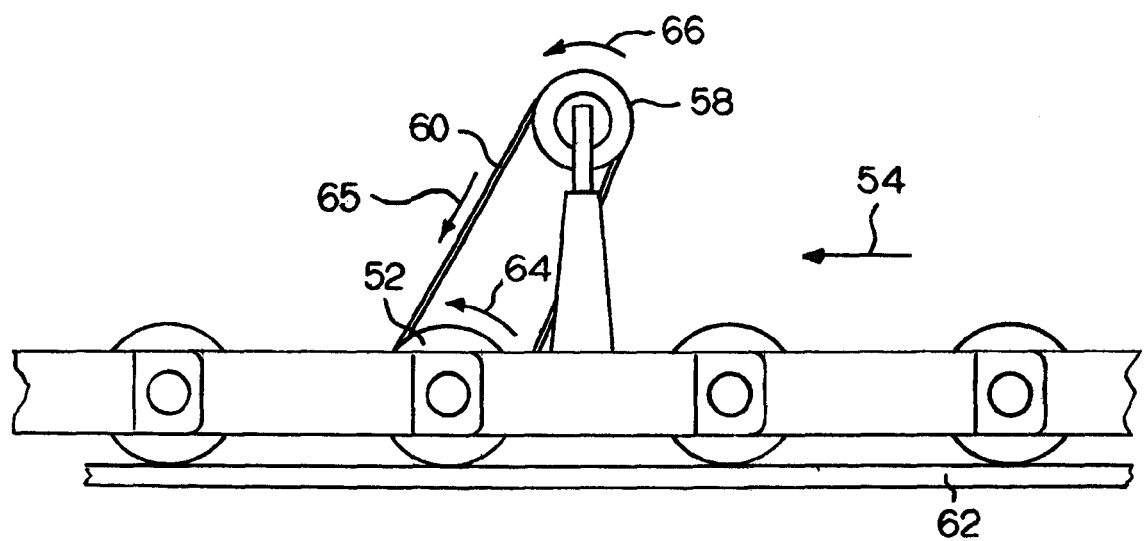
FIG. 4 is a side elevation view representing another version of a conveyor belt as in FIG. 1, but with a transmission band linking an in-line belt roller and a supported roller.
Figure 5:
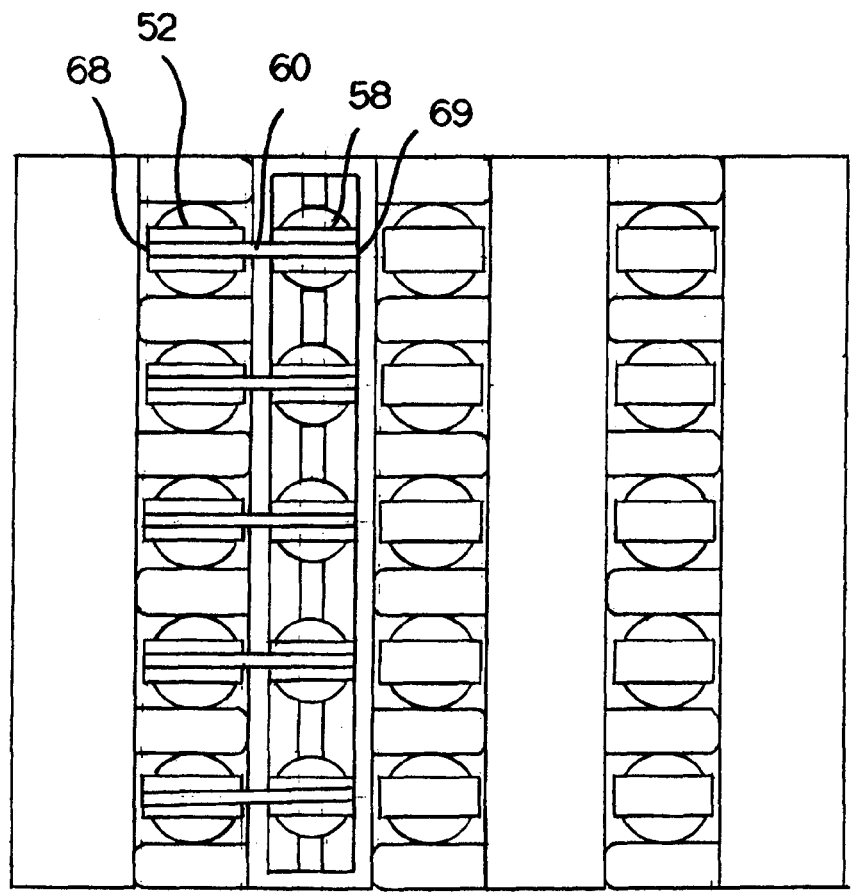
FIG. 5 is a top plan view of the belt of FIG. 4.

A driven roller 58 is shown in the belt represented by FIGS. 4 and 5. In this belt, the roller 58 is connected to an accelerating roller 52 by a transmission band 60, such as a rubber band. As the belt advances in the direction of belt travel 54, the bottom of the accelerating roller rides along the bearing surface of a carryway 62. The motion of the belt causes the accelerating rollers to rotate as indicated by arrow 64, which advances the band in the direction of arrow 65, which rotates the flight-clearing roller 58 as indicated by arrow 66. The accelerating roller in contact with a carryway and the transmission band constitute one means for rotating the driven roller. An article deposited atop the roller is pushed forward over the flight by the flight-clearing roller and the accelerating rollers in contact with the article. Consequently, the article is cleared from its position leaning atop the flight and into the forward bin in registration against the flight. The band 60 preferably rides in circumferential grooves 68, 69 formed in the peripheries of the rollers.

Figure 6:
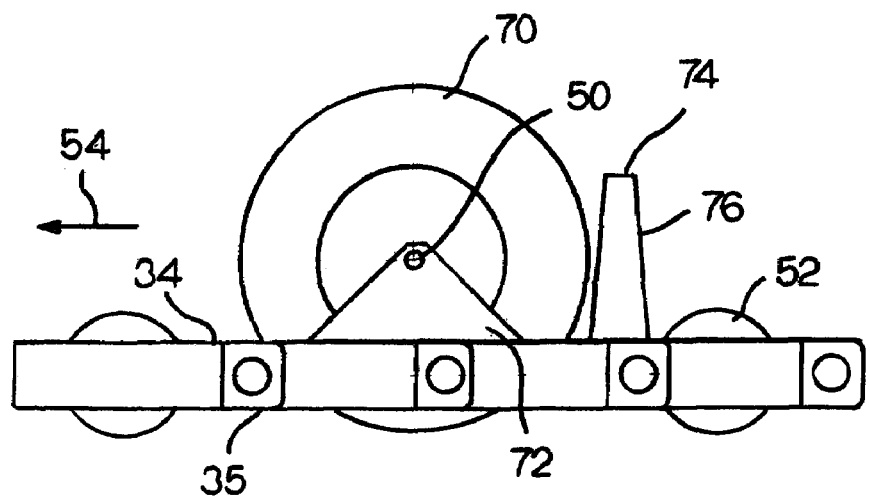
FIG. 6 is a side elevation view representing still another version of a conveyor belt as in FIG. 1 with a large-diameter roller adjacent to a flight.

In another version of the belt, shown in FIG. 6, a large-diameter roller 70 is rotatable on an axle 50 supported in stanchions 72 extending upward from the conveying surface 34 forming another means for rotating the roller. A salient portion of the roller extends past the opposite surface 35 of the belt to engage a carryway in rolling contact. The roller extends upward above the distal end 74 of a flight 76 positioned adjacent to the roller. An article leaning on the flight is propelled over the flight in the direction of belt travel 54 by upstream accelerating rollers 52 and the large-diameter roller 70.

Figure 7:
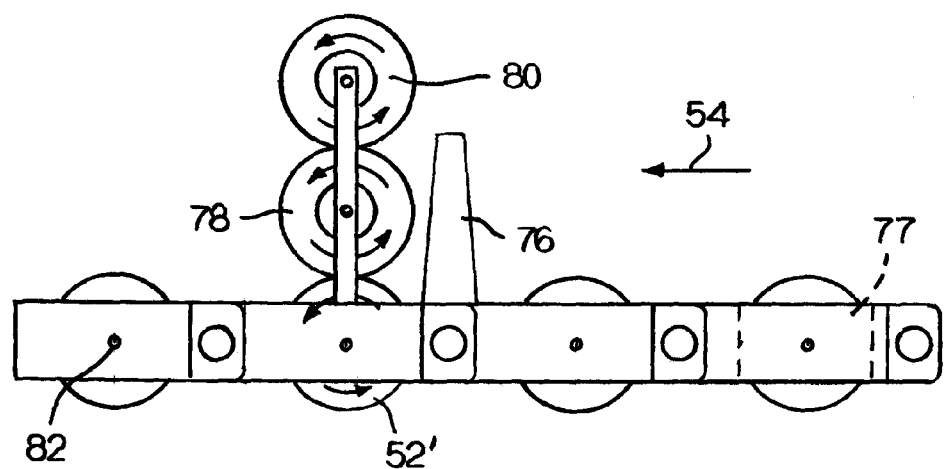
FIG. 7 is a side elevation view representing yet another version of a conveyor belt as in FIG. 1 with multiple rollers adjacent to a flight.

Still another version of conveyor belt is shown in FIG. 7. In this version, a stack of three rollers is used to clear articles over a flight 76. An accelerating roller 52' at the bottom of the stack rotates as indicated when the belt advances in the direction of belt travel 54. An intermediate roller 78 is rotated by the accelerating roller in the opposite direction. A top roller 80 contacting the intermediate roller is driven in the same direction as the accelerating roller to assist articles leaning on the adjacent flight 76 into the forward bin. The engaged intermediate and accelerating rollers in the stack compose yet another means for rotating the top roller. Unlike in some of the other versions of the belt, the accelerating rollers 52 are shown in this version in cavities 77 formed in the belt structure midway between opposite hinge eyes. In this case, the accelerating rollers rotate, not on the hinge rods, but on dedicated axles 82 supported in intermediate belt structure between longitudinally opposed sets of hinge eyes on a belt row.

Figure 8:
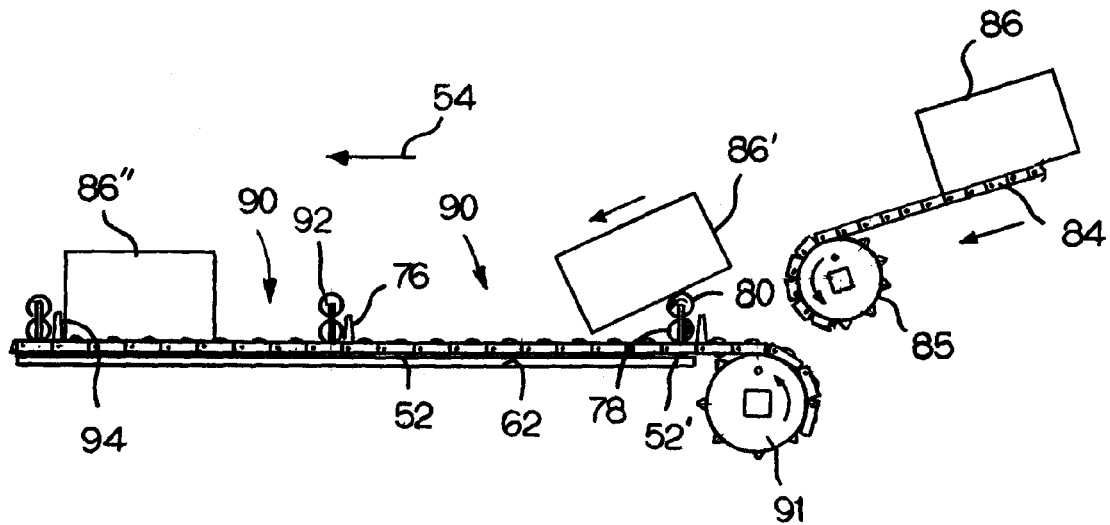
FIG. 8 is a side elevation view of a conveyor using a conveyor belt as in FIG. 7.

A conveyor system using the belt of FIG. 7 is shown in FIG. 8. The conveyor system includes an infeed conveyor belt 84 driven by a drive sprocket 85 delivering articles 86 to a flighted belt 88 like that depicted in FIG. 7. The conveying surface of the flighted belt is separated into consecutive bins 90 by the flights 76 and roller stacks 92 positioned on the belt slightly downstream of the flights. The belt is trained between an idle sprocket 91 and a drive sprocket at the end of a carryway 62. The flighted belt includes accelerating rollers 52 extending past the conveying and opposite surfaces of the belt into rolling contact with the carryway. As the belt advances in the direction of belt travel 54, the accelerating rollers contacting the carryway rotate to propel articles conveyed atop the accelerating rollers forward. The rotation of the accelerating roller 52' at the bottom of the stack causes the top roller 80 to rotate in the same direction through the action of the intermediate roller 78 interposed between the top and bottom rollers. When an article, such as the article 86', is deposited on the belt atop the roller stack, the article spans two bins, instead of sitting squarely within a single bin. The forward rotation of the top roller and of the accelerating rollers under the article's leading edge propels the article forward into the leading bin. Once the article clears the roller stack and is completely within the bin, the accelerating rollers 52 advance the article forward until it is stopped at the rear edge 94 of the flight 76 marking the downstream border of the bin, as indicated by the position of the article 86". Thus, the depicted conveyor registers conveyed articles at spaced positions defined by the intervals between registration edges 94 at the rears of successive flights and avoids stranding articles deposited on the conveyor from above atop flights or other article-positioning components.

Figure 9:
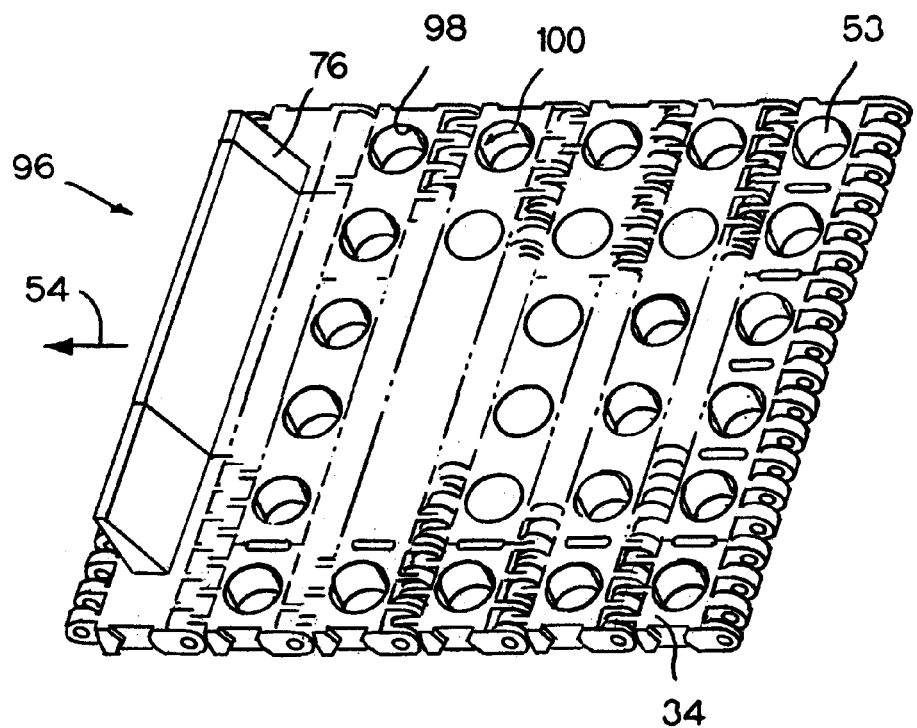
FIG. 9 is an isometric view of a portion of another version of a conveyor belt usable in a registration conveyor embodying features of the invention, including oblique acceleration rollers.

Another version of a conveyor belt that is useful in registering conveyed articles is shown in FIG. 9. The belt 96 has accelerating rollers 53 mounted in cavities 98 on axles oriented oblique, instead of perpendicular, to the direction of belt travel 54. When rolling on a carryway, the accelerating rollers propel conveyed articles, as indicated by arrow 100, laterally across the belt as well as forward in the direction of belt travel. Articles conveyed atop the belt are advanced obliquely along the belt's conveying surface 34 into a registered position against a flight 76. Although not shown, flight-clearing rollers could be positioned adjacent to or on the flight to prevent stranding articles atop the flight.

Figure 10:
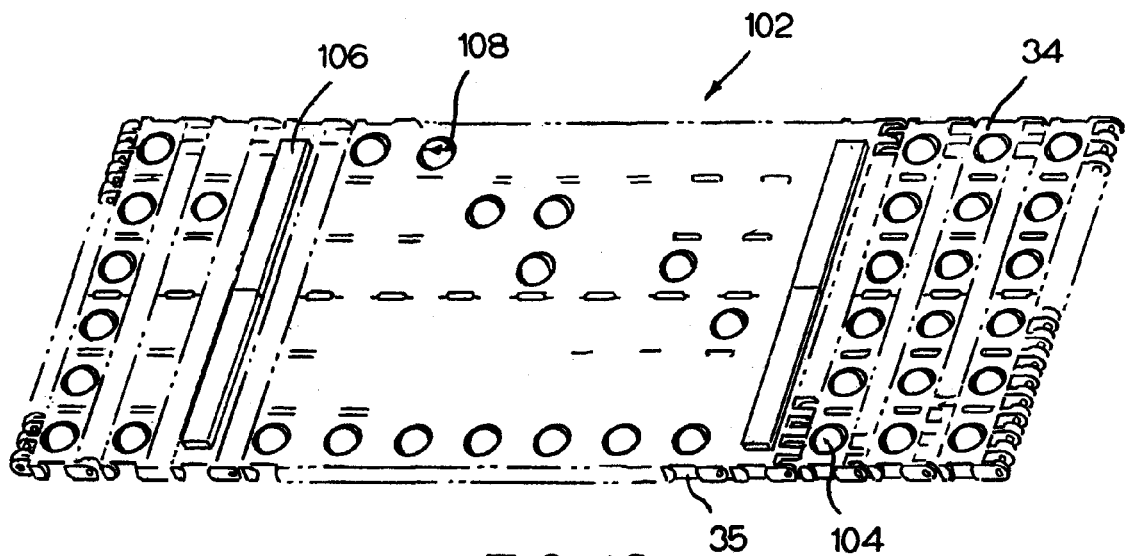
FIG. 10 is an isometric view of a portion of another version of conveyor belt usable in a registration conveyor embodying features of the invention, including accelerating roller balls and frictional registration areas.

Yet another registration conveyor belt is shown in FIG. 10. The belt 102 uses freely rotatable spherical balls 104 as accelerating rollers and frictional pads 106 as registration elements. The balls extend past the conveying and opposite surfaces 34, 35 of the belt so that they can roll on a supporting carryway below and support conveyed articles. When the belt advances along a carryway in the direction of belt travel 54, the roller balls roll along the carryway's bearing surface in the direction of belt travel, as indicated by arrow 108, to propel conveyed articles forward along the belt. When a conveyed article is pushed by the accelerating roller balls onto a downstream friction pad, the article comes to rest on the conveying surface at a registered position defined by the placement of the pad on the belt. Although the friction pads shown in FIG. 10 each reside on a single belt row, a friction pad region may span several consecutive belt rows, especially if the articles are large. The frictional registration areas may be realized as rubber-like elastomeric pads or as rough-textured surface areas. Frictional pads may be integrally molded with the modules or attached to the modules mechanically or adhesively.

Although the invention has been described with respect to a few preferred versions, other versions are possible. For example, to minimize slip between the rollers and the carryway or conveyed articles, the outer surfaces of the rollers could be made of a higher friction elastomeric material. As another example, the flights, instead of being stationary, could be selectively retracted or pivoted out of an article-registering position when not needed. Roller balls, oblique rollers, or in-line rollers may be used with positioning elements, such as flights, elastomeric pads, or frictional surfaces and with or without flight-clearing rollers in many combinations to fit the application. As yet another example, the carryway forming the bearing surfaces for the accelerating rollers may be realized as parallel wearstrips, a carryway plate, or gravity rollers aligned beneath the accelerating rollers in the direction of belt travel. The bearing surfaces may be stationary or selectively positionable into and out of contact with the accelerating rollers. So, as these few examples suggest, the scope of the claims is not meant to be limited to the preferred versions described in detail.

What is claimed is:

1. A conveyor belt comprising:
 a conveying surface extending longitudinally in a direction of belt travel and laterally from a first side edge to a second side edge;
 an opposite surface defining, with the conveying surface, the thickness of the conveyor belt;
 a plurality of laterally disposed supports upstanding from the conveying surface out to distal ends;
 first rollers mounted at the distal ends of the supports;
 wherein consecutive supports are longitudinally spaced to separate the conveying surface into individual article-conveying bins;
 means for rotating the first rollers as the conveyor belt advances in the direction of belt travel, the means for rotating the first rollers being adapted to ride on a bearing surface proximate the opposite surface to rotate the first rollers as the conveyor belt advances.

2. A conveyor belt as in claim 1 further comprising laterally extending axles supported at the distal ends of the supports and on which the first rollers rotate.

3. A conveyor belt as in claim 1 wherein the means for rotating the first rollers comprises second rollers contacting the first rollers.

4. A conveyor belt as in claim 3 further comprising third rollers contacting the second rollers and extending past the opposite surface of the conveyor belt.

5. A conveyor belt as in claim 1 wherein the means for rotating the first rollers comprises second rollers extending past the opposite surface of the conveyor belt and bands trained around the second rollers and the first rollers to rotate the first rollers as the second rollers rotate.

6. A conveyor belt as in claim 1 wherein the first rollers are passive rollers.

7. A conveyor belt as in claim 1 further comprising a plurality of second rollers extending through the thickness of the conveyor belt past the conveying and opposite surfaces between consecutive supports.

8. A conveyor belt as in claim 7 wherein the second rollers are roller balls.

9. A conveyor belt as in claim 7 wherein the second rollers are arranged to rotate on axles oblique to the direction of belt travel.

10. A conveyor belt as in claim 1 further comprising laterally extending flights upstanding from the conveying surface adjacent the supports.

11. A conveyor comprising:
 a conveyor belt extending longitudinally in a direction of belt travel along a conveying path, laterally from a first side edge to a second side edge, and in thickness from a conveying surface to an opposite surface;
 a carryway including a bearing surface supporting the conveyor belt along a portion of the conveying path;
 a plurality of laterally disposed supports upstanding from the conveying surface out to distal ends;
 first rollers mounted at the distal ends of the supports;
 wherein consecutive supports are longitudinally spaced to separate the conveying surface into individual article-conveying bins;
 means for rotating the first rollers as the conveyor belt advances in the direction of belt travel, the means for rotating the first rollers riding on the bearing surface of the carryway to rotate the first rollers as the conveyor belt advances.

12. A conveyor as in claim 11 further comprising laterally extending axles supported at the distal ends of the supports and on which the first rollers rotate.

13. A conveyor as in claim 11 wherein the means for rotating the first rollers comprises second rollers contacting the first rollers.

14. A conveyor as in claim 13 further comprising third rollers contacting the second rollers and extending past the opposite surface of the conveyor belt into rolling contact with the carryway as the conveyor belt advances in the direction of belt travel.

15. A conveyor as in claim 11 wherein the means for rotating the first rollers comprises second rollers extending past the opposite surface of the conveyor belt into rolling contact with the carryway as the conveyor belt advances in the direction of belt travel and bands trained around the second rollers and the first rollers to rotate the first rollers as the second rollers rotate.

16. A conveyor as in claim 11 wherein the first rollers are passive rollers.

17. A conveyor as in claim 11 further comprising a plurality of second rollers extending through the thickness of the conveyor belt past the conveying and opposite surfaces between consecutive supports into contact with the bearing surface of the carryway to rotate the second rollers as the conveyor belt advances in the direction of belt travel.

18. A conveyor as in claim 17 wherein the second rollers are roller balls.

19. A conveyor as in claim 17 wherein the second rollers are arranged to rotate on axles oblique to the direction of belt travel.

20. A conveyor as in claim 11 further comprising laterally extending flights upstanding from the conveying surface adjacent the supports.

21. A conveyor belt comprising:
 a top conveying surface extending longitudinally in a direction of belt travel and laterally from a first side edge to a second side edge;
 an opposite bottom surface defining, with the conveying surface, the thickness of the conveyor belt;
 a plurality of flights extending laterally across the width of the top conveying surface, each flight having a rear edge defining article registration positions at longitudinally spaced positions;
 first rollers mounted at the tops of the flights and rotatable on lateral axes;
 a plurality of second rollers extending through the thickness of the conveyor belt past the top conveying and bottom surfaces and adapted to rotate in contact with a bearing surface proximate the bottom surface of the conveyor belt and push articles forward into registration with the rear edge of a flight as the conveyor belt advances in the direction of belt travel.

22. A conveyor belt as in claim 21 wherein each of the first rollers are coupled to a second roller so that the first rollers are caused to rotate by the rotation of the corresponding second roller.

* * * * *